United States Patent
Kim et al.

(10) Patent No.: US 10,759,915 B2
(45) Date of Patent: Sep. 1, 2020

(54) THERMOPLASTIC MATERIAL FOR VEHICLE INTERIOR OR EXTERIOR, METHOD FOR PREPARING THE SAME AND ARTICLE FOR VEHICLE INTERIOR OR EXTERIOR USING THE SAME

(71) Applicant: HADO FNC CO., LTD., Gyeonggi-do (KR)

(72) Inventors: Young Su Kim, Gyeonggi-do (KR); Jong Eun Ha, Seoul (KR)

(73) Assignee: HADO FNC CO., LTD., Gyeonggi-Do (KR)

( * ) Notice: Subject to any disclaimer, the term of this patent is extended or adjusted under 35 U.S.C. 154(b) by 154 days.

(21) Appl. No.: 15/864,344

(22) Filed: Jan. 8, 2018

(65) Prior Publication Data

US 2018/0194908 A1    Jul. 12, 2018

(30) Foreign Application Priority Data

Jan. 10, 2017 (KR) .......................... 10-2017-0003454

(51) Int. Cl.
*C08J 5/04* (2006.01)
*B62D 29/04* (2006.01)
(Continued)

(52) U.S. Cl.
CPC ............... *C08J 5/043* (2013.01); *B29D 7/00* (2013.01); *B62D 29/043* (2013.01); *C08J 5/042* (2013.01);
(Continued)

(58) Field of Classification Search
CPC ...... C08L 23/06; C08L 23/12; C08L 23/0815; B29D 7/00; B29L 2031/3005; B29L 2031/3055; B29L 2031/3014; B29L 2031/3041; B29L 2031/30; B29L 2031/3011; B29L 2009/005; B29L 2009/00; C08J 5/042; C08J 5/043; C08J 5/044; B29C 43/18; B29C 43/52; B29C 43/02;
(Continued)

(56) References Cited

U.S. PATENT DOCUMENTS 5,194,462 A  *  3/1993  Hirasaka ................. B29C 70/12
                                                   428/299.4

FOREIGN PATENT DOCUMENTS

JP      2008-302595 A      12/2008
KR   10-2016-0019195 A      2/2016

* cited by examiner

*Primary Examiner* — Camie S Thompson
(74) *Attorney, Agent, or Firm* — Nath, Goldberg & Meyer; Joshua B. Goldberg; Tanya E. Harkins

(57) ABSTRACT

Are disclosed a thermoplastic material for vehicle interior or exterior having not only excellent strength in winter but also excellent sound-absorption and heat-resistance, a method for preparing the same and an article for vehicle interior or exterior using the same. A method for producing a thermoplastic material for interior or exterior of vehicle, comprising the steps of: forming a fiber sheet or web by randomly arranging fibers having a length of 50 mm or more, the fibers being selected from the group consisting of glass fibers, carbon fibers, basalt fibers, aramid fibers and mixtures thereof; applying polyethylene powders to one side or both sides of the fiber sheet or web; forming a fiber reinforced mat by heating and pressing the fiber sheet or web to which the polyethylene powders are applied; and laminating the fiber reinforced mat on one side or both sides of a polypropylene base.

5 Claims, 4 Drawing Sheets

(51) Int. Cl.
  *B29D 7/00*  (2006.01)
  *C08L 23/12*  (2006.01)
  *B29L 31/30*  (2006.01)

(52) U.S. Cl.
  CPC ....... *C08J 5/044* (2013.01); *B29L 2031/3005* (2013.01); *B29L 2031/3055* (2013.01); *C08L 23/12* (2013.01); *C08L 2203/00* (2013.01)

(58) Field of Classification Search
  CPC ......... B29C 43/00; B29C 43/14; B29C 70/12; B29C 70/508; B60R 13/02; B60R 13/0243; B60R 13/0212; B60R 13/0225; B29K 2101/12; B29K 2023/06; B29K 2023/12; B32B 2605/003; B32B 2305/08; Y10T 428/24996
  USPC ........ 156/242, 79; 264/319, 257; 428/297.4, 428/403
  See application file for complete search history.

[Figure 1]
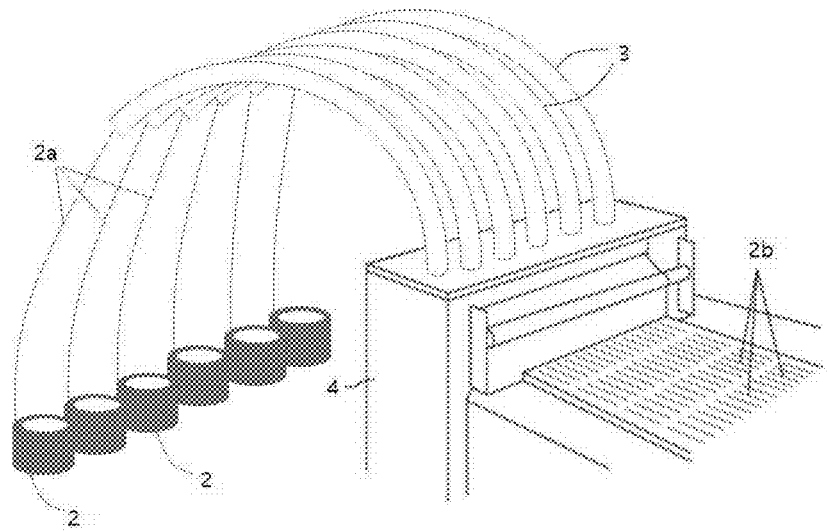
[Figure 2]
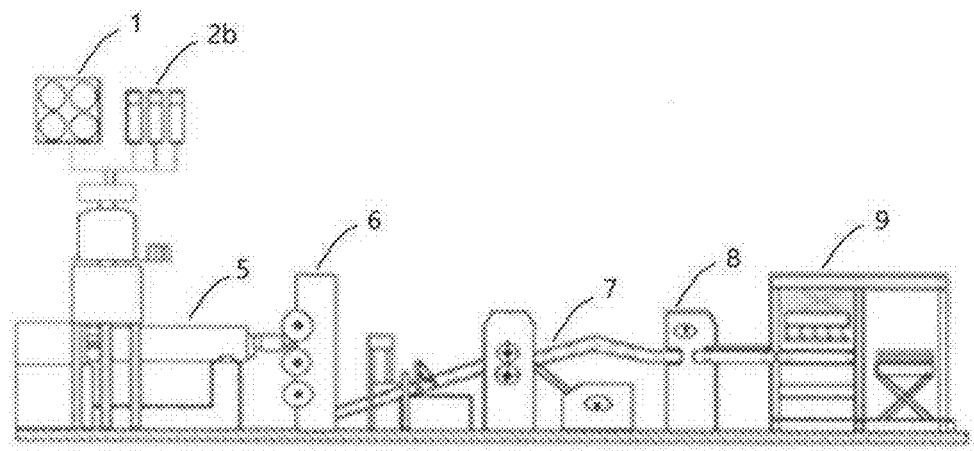

[Figure 3]
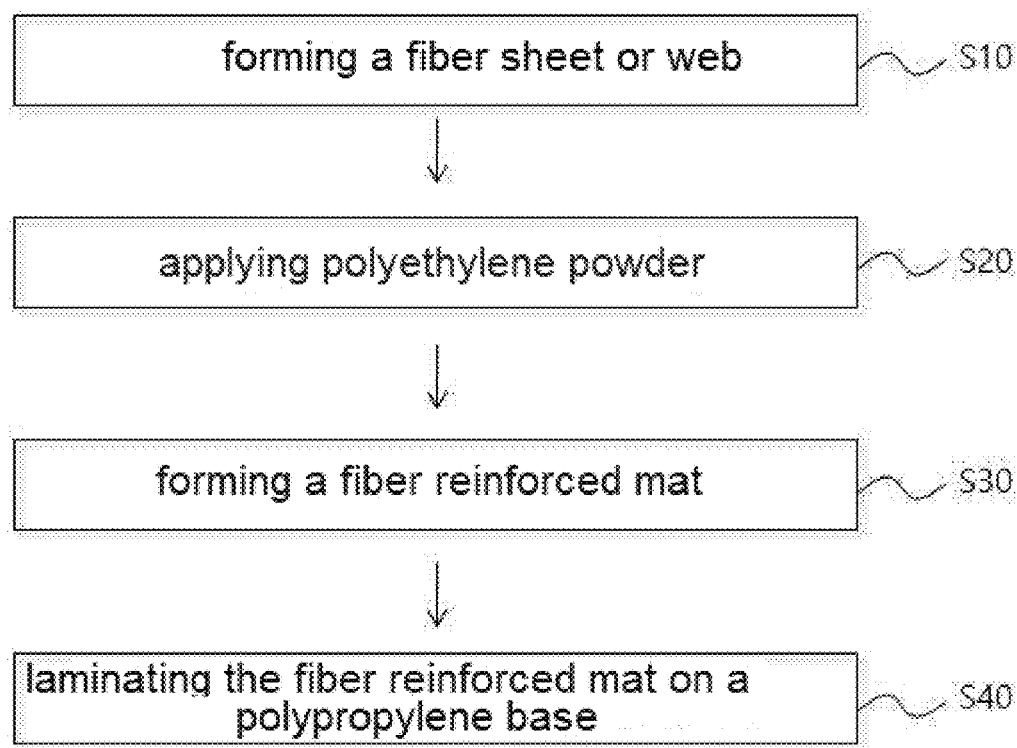
[Figure 4]
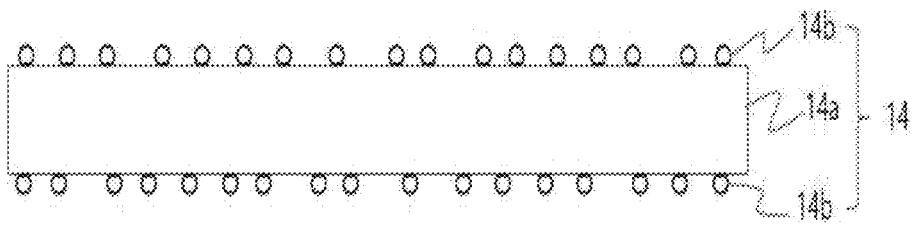
[Figure 5]
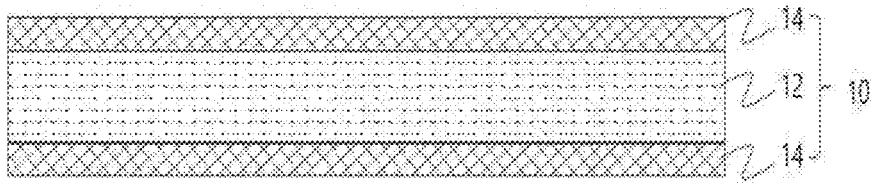

[Figure 6]
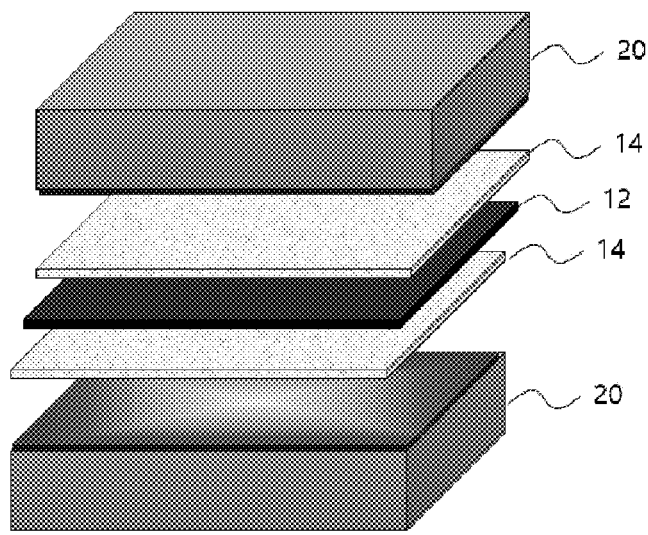
[Figure 7]
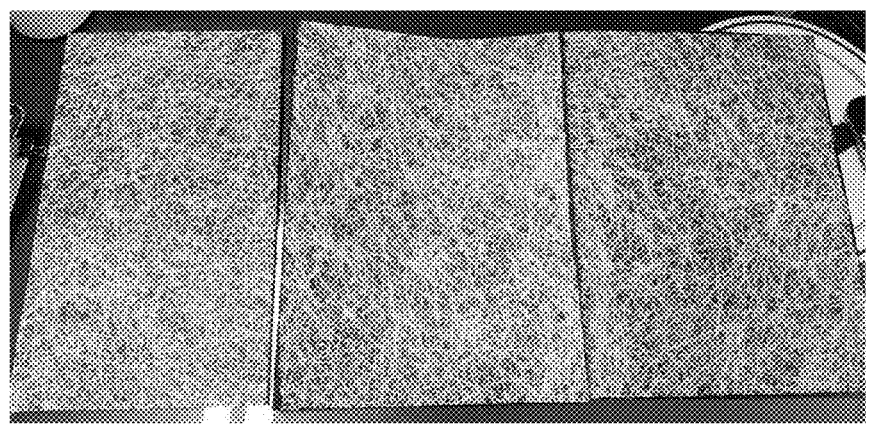

[Figure 8]
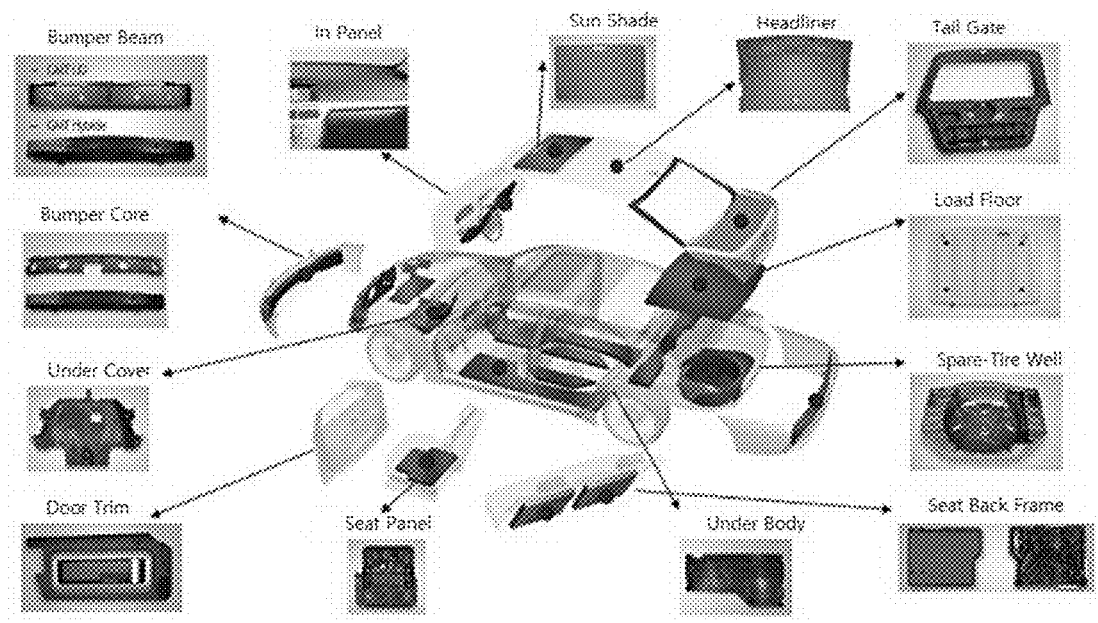

THERMOPLASTIC MATERIAL FOR VEHICLE INTERIOR OR EXTERIOR, METHOD FOR PREPARING THE SAME AND ARTICLE FOR VEHICLE INTERIOR OR EXTERIOR USING THE SAME

TECHNICAL FIELD

This invention relates to a thermoplastic material for vehicle interior or exterior, a method for preparing the same and an article for vehicle interior or exterior using the same, and more particularly to a thermoplastic material for vehicle interior or exterior having not only excellent strength in winter but also excellent sound-absorption and heat-resistance, a method for preparing the same and an article for vehicle interior or exterior using the same.

BACKGROUND ART

Generally, thermoplastic resins are molded and used as base materials for vehicle interior and exterior materials. Among them, polypropylene (PP) resin is mainly used since it is excellent in physical properties to a price and also has a melting temperature of 150 to 160° C., which is suitable for bonding with other materials and for performing heating and molding process. However, there are some disadvantages that the polypropylene resin has poor heat-resistance so that it is contracted by heat, and has weak strength at a low temperature such as the winter season so that it breaks or ruptures.

For overcoming such disadvantages, conventionally additives such as wood powder and calcium carbonate have been mixed with the polypropylene resin, alternatively, glass fiber reinforced thermoplastics (GMT), which is a mixture of polypropylene resin and glass fiber, has been applied to various applications. However, the additive mixing method could not fundamentally solve the above disadvantages.

FIGS. 1 and 2 show processes of producing a thermoplastic material according to the conventional art. As shown in FIGS. 1 and 2, in case of glass fiber reinforced thermoplastics (GMT), the polypropylene resin 1 and the glass fiber 2b are supplied together to the extruder 5 so that the length of the glass fiber 2 should be about 10 mm. For this, first, the glass fiber 2a from the roving yarn 2 is fed to a fiber cutter 4 through a fiber moving tube 3 to be cut to about 10 mm. Next, the polypropylene resin 1 and the glass fiber 2b which is cut are supplied to the extruder 5 at the same time to be melted and extruded from the extruder 5, and then pressed by a press roller (calender) 6. The pressed material is hauled off through a conveyor belt 7, etc., then cut by a cutter 8, and stacked on a stacker 9. Therefore, it takes a lot of cost to equip the manufacturing facility and there are few companies capable of manufacturing the materials accordingly so that the manufacturing cost of the material is very high. Further, the cut glass fibers 2b can be broken or cut by heat and pressure in the extruder 5, and the length of the fiber (fiber length) is further shortened, whereby improvement of the properties thereof is not efficient. Here, the roving yarn refers to a bundle of fibers that are wound uniformly.

In addition, external noises, for example, fricatives between a tire and a ground, noise generated by high-temperature and high-pressure combustion gas flow in an exhaust system, noise which is generated in an engine and transmitted through a vehicle body or air (noise generated in the engine room), are introduced to the interior of the running vehicle through various paths, which hinders the feeling of quietness of the vehicle.

Therefore, it has been required to develop a material having excellent strength even in the winter season and excellent sound-absorption and heat-resistance.

DISCLOSURE

Technical Problem

Therefore, it is an object of the present invention to provide a thermoplastic material for interior or exterior of vehicle that do not rupture in winter, a method for preparing the same and an article for vehicle interior or exterior using the same.

It is another object of the present invention to provide a thermoplastic material for interior or exterior of vehicle which is lighter as compared with conventional ones and has excellent sound-absorption as well as excellent heat-resistance, a method for preparing the same and an article for vehicle interior or exterior using the same.

Technical Solution

In order to achieve these objects, the present invention provides a method for producing a thermoplastic material for interior or exterior of vehicle, comprising the steps of: forming a fiber sheet or web by randomly arranging fibers having a length of 50 mm or more, the fibers being selected from the group consisting of glass fibers, carbon fibers, basalt fibers, aramid fibers and mixtures thereof; applying polyethylene powder to one side or both sides of the fiber sheet or web; forming a fiber reinforced mat by heating and pressing the fiber sheet or web to which the powder is applied; and laminating the fiber reinforced mat on one side or both sides of a polypropylene base.

The present invention provides also a thermoplastic material for interior or exterior of vehicle comprising a polypropylene base; and a fiber reinforced mat formed on one side or both sides of the polypropylene base, the fiber reinforced mat including fibers selected from the group consisting of glass fibers, carbon fibers, basalt fibers, aramid fibers and mixtures thereof and polyethylene.

Technical Effects

The thermoplastic material for vehicle interior and exterior materials according to the present invention has some advantages that it is excellent in strength not to rupture even in the winter season, is excellent in heat-resistance and sound-absorption, and has a low manufacturing cost.

BRIEF DESCRIPTION OF DRAWINGS

FIGS. 1 and 2 show processes of producing a thermoplastic material according to a conventional art.

FIG. 3 is a flow chart for showing a process of producing a thermoplastic material according to the present invention.

FIG. 4 is a sectional view of a fiber reinforced mat according to an embodiment of the present invention.

FIG. 5 is a sectional view of a thermoplastic material according to an embodiment of the present invention.

FIG. 6 shows the laminating the fiber reinforced mat according to an embodiment of the present invention.

FIG. 7 is a photograph of a thermoplastic material according to an embodiment of the present invention.

FIG. 8 is a drawing for showing an example in which a thermoplastic material according to the present invention can be used.

DETAILED DESCRIPTION OF INVENTION

A more complete appreciation of the invention, and many of the attendant advantages thereof, will be better appreciated by reference to the following detailed description.

FIG. 3 is a flow chart for showing a process of producing a thermoplastic material according to the present invention, and FIGS. 4 and 5 are sectional views of a fiber reinforced mat and a thermoplastic material respectively, according to an embodiment of the present invention. As shown in FIGS. 3 to 5, a method for producing a method for producing a thermoplastic material for interior or exterior of vehicle, comprising the steps of: forming a fiber sheet or web 14a (S10); applying polyethylene powder (S20); forming a fiber reinforced mat 14 (S30); and laminating the fiber reinforced mat 14 on a polypropylene base 12 (S40).

In step S10 of forming the fiber sheet or web 14a, typically used fibers (for example, roving yarn) are chopped to have a diameter of 50 mm or more, preferably 50 to 200 mm, more preferably 50 to 120 mm, and the chopped fibers are dispersed by air blowing or the like so that the fibers are randomly arranged, thereby forming the fiber sheet or web.

As the fibers for forming the fiber sheet or web 14a, there may be used commonly used super fibers such as carbon fiber, glass fiber, basalt fiber, aramid fiber aramid fiber, and mixtures thereof, and preferably glass fibers can be used. Use of a fiber having a length of 50 mm or more can improve physical properties such as strength, heat-resistance and sound-absorption property of the polypropylene base.

In step S20 of applying polyethylene powder, the polyethylene powder is applied to one side or both sides of the fiber sheet or web 14a, preferably both sides of fiber sheet or web 14a. The application of the polyethylene powder prevents the thermoplastic material according to the present invention from being frosted during the winter season, makes it lightweight, and imparts insulation and moisture resistance. Examples of the polyethylene to be used include polyethylene in the form of powder in the commonly used such as high-density polyethylene (HDPE), low-density polyethylene (LDPE), linear low-density polyethylene (LL-DPE) and so on.

In step S30 of forming the fiber reinforced mat 14, the surface of the fiber sheet or web 14a to which the polyethylene powder is applied is heated and the polyethylene powder is melted and then pressed, to form the fiber-reinforced mat 14 including a heat-treated layer 14b formed on one side or both sides of the fiber sheet or web 14a by melting polyethylene. The heating of the fiber sheet or web 14a may be performed to melt only the polyethylene powder applied to the surface. Preferably the heating of the fiber sheet or web 14a may performed to heat not only the polyethylene powder applied to the surface of the fiber sheet or web 14a but also the fiber sheet or web 14a, which may further enhance the adhesion with the molten polyethylene. The heat-treated layer 14b is formed by melting and pressing the polyethylene powder, and the heating is performed by a heating device positioned to face the upper surface and/or the lower surface of the fiber sheet or web 14a. The heating may be performed indirectly by using a heating device such as an infrared ray heater, a ceramic heater, or the like, or may be performed directly by pressing using a heated hot plate. The heating of the fiber sheet or the web 14a by the heating device is performed at a temperature of 180 to 220° C., preferably 190 to 210° C. for 20 to 70 seconds, preferably 30 to 60 seconds. Here, if the heating temperature and time are out of the above range, the polyethylene powder may not be sufficiently melted, so that strength, sound-absorption and heat-resistance of the material may be deteriorated, or manufacturing efficiency may be uneconomical.

The pressing can be performed by any conventional equipment without any limitation as long as the heated fiber sheet or the web 14a can be pressed, but it is preferable that the pressing is performed with a cooling roller. By the pressing process of the fiber sheet or the web 14a, the melted fiber sheet or web 14a and the polyethylene powder are pressed and cooled to form the heat-treated layer 14b on the surface of the fiber sheet or web 14a so that heat-resistance, strength, sound-absorption and moisture-proof property are imparted to the thermoplastic material.

The heat-treated layer 14b may have a structure in which melted polyethylene is pressed and dispersed on the surface of the fiber sheet or the web 14a in the form of a projection. Alternatively, the heat-treated layer 14b may be a structure covering the surface of the fiber sheet or the web 14a. Preferably the heat-treated layer 14b may be formed on one side or both sides of the fiber sheet or the web 14a with a structure dispersed on the surface of the fiber sheet or the web 14a. In the fiber reinforced mat 14, the thickness of the fiber sheet or web 14a may be 2 to 8 mm, preferably 3 to 5 mm, and the thickness of the heat-treated layer 14b may be more than 0 to 2 mm, preferably 0.1 to 1 mm. If the thickness of the fiber sheet or the web 14a and the heat-treated layer 14b is out of the above range, the desired properties may not be obtained.

The weight of the fiber reinforced mat 14 is 60 to 180 gsm (gram per square meter), preferably 80 to 150 gsm. If the weight of the fiber reinforced mat 14 is too small, the desired properties may not be achieved, and if it is too large, it may be unnecessarily heavy and uneconomical.

In step S40 of laminating the fiber reinforced mat 14 on the polypropylene base 12, the fiber reinforced mat 14 produced as described above is successively fed to one or both sides of the polypropylene base 12 in the direction of melting/extrusion of the polypropylene base in the extruder, so that the polypropylene base 12 to be extruded and the fiber reinforced mat 14 which is successively placed on one side or both sides of the polypropylene base are pressed by using a roller, thereby obtaining laminate of the thermoplastic material 10 according to the present invention.

FIG. 6 shows the laminating the fiber reinforced mat according to an embodiment of the present invention. As shown in FIG. 6, the fiber reinforced mat 14 is placed on one side or both sides of the polypropylene base 12 and then pressed using a heat plate 20, to form the thermoplastic material 10 according to the present invention.

When the extruded polypropylene base 12 and the fiber reinforced mat 14 are pressed together by using a roller (for example, a cooling roller), because the polypropylene base 12 and the fiber reinforced mat 14 successively move, the laminate is cut to a predetermined size (desired size) and then stacked, or in addition heated using a heating apparatus as described above so as to form molding in the form of desired interior and exterior materials which is to be used as articles for vehicle interior and exterior materials according to the present invention.

When the polypropylene base 12 and the fiber reinforced mat 14 are laminated using the heat plate 20, the reinforced mat 14 is placed on the upper and/or lower surface of the polypropylene base 12 and the heat plate 20 is placed on the upper and/or the lower surface of the reinforced mat 14. And the polypropylene base 12 and the reinforcing mat 14 are joined together by pressing of the heat plate 20 to form the laminate. Next, the laminate is molded into a desired interior/exterior material and used as a molded article for a vehicle interior and exterior material according to the present invention. The laminate using the heat plate 20 has relatively simple process so it is economical. Since placing the fiber reinforced mat 14 on only one side of the polypropylene base 12 may cause curling, it is desirable to place the fiber reinforced mat 14 on both sides of the polypropylene base 12.

FIG. 7 is a photograph of a thermoplastic material according to an embodiment of the present invention, and FIG. 8 is a drawing for showing an example in which a thermoplastic material according to the present invention can be used. As shown in FIGS. 7 and 8, the thermoplastic material according to the present invention has a fiber reinforced mat including polyethylene and fibers formed on the surface of the polypropylene base so that it can be prevented from being ruptured during the winter season. In addition, since the glass fiber reinforced composite material (GMT) is not used for the interior and exterior materials for vehicles having excellent heat-resistance and sound-absorption, the thermoplastic material of the present invention can be manufactured at low cost. The thermoplastic material of the present invention can be used for a variety of vehicle interior and exterior materials, preferably internal and external materials with a high load, such as bumper beams, bumper cores, PKG trays, RR floors, honeycomb board such as cargo tray for SUV and the like.

While the present invention has been particularly shown and described with reference to exemplary embodiments thereof, it is to be understood that the invention is not limited to the disclosed exemplary embodiments, but, on the contrary, Various modifications are possible within the range described above.

The invention claimed is:

1. A method for producing a thermoplastic material for interior or exterior of vehicle, comprising the steps of:

forming a fiber sheet or web by randomly arranging fibers having a length of 50 mm or more, the fibers being selected from the group consisting of glass fibers, carbon fibers, basalt fibers, aramid fibers and mixtures thereof;

applying polyethylene powders to both sides of the fiber sheet or web;

forming a fiber reinforced mat by heating and pressing the fiber sheet or web to which the polyethylene powders are applied, wherein the fiber reinforced mat includes heat-treated layers formed on both sides of the fiber sheet or web by melting the polyethylene powders; and laminating the fiber reinforced mat on one side or both sides of a polypropylene base;

wherein a thickness of the fiber sheet or web is 3 to 5 mm, and a thickness of the heat-treated layer is 0.1 to 1 mm.

2. The method of claim 1, wherein in the step of laminating the fiber reinforced mat, the polypropylene base is melted and extruded, the fiber reinforced mat is successively placed on one side or both sides of the polypropylene base in the same direction as the polypropylene base to be extruded, and the fiber reinforced mat together with the polypropylene base is pressed to form a laminate, and the laminate is cut to a predetermined size to be stacked.

3. The method of claim 2, further comprising a step of heating and molding the laminate into the desired shape after the step of laminating the fiber reinforced mat.

4. The method of claim 1, wherein in the step of laminating the fiber reinforced mat, the fiber reinforced mat is placed on one side or both sides of the polypropylene base, and then is pressed by a hot plate to form a laminate.

5. The method of claim 4, further comprising a step of successively molding the laminate into the desired shape after the step of laminating the fiber reinforced mat.

* * * * *